(12) United States Patent
Nennemann et al.

(10) Patent No.: US 8,669,323 B2
(45) Date of Patent: Mar. 11, 2014

(54) STABLE POLYISOCYANATES COMPRISING NANOPARTICLES

(75) Inventors: Arno Nennemann, Bergisch-Gladbach (DE); Sebastian Dörr, Düsseldorf (DE); Oliver Pyrlik, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 167 days.

(21) Appl. No.: 12/993,023

(22) PCT Filed: May 5, 2009

(86) PCT No.: PCT/EP2009/003192
§ 371 (c)(1),
(2), (4) Date: Nov. 16, 2010

(87) PCT Pub. No.: WO2009/138181
PCT Pub. Date: Nov. 19, 2009

(65) Prior Publication Data
US 2011/0100259 A1     May 5, 2011

(30) Foreign Application Priority Data
May 16, 2008   (EP) .................................. 08009064

(51) Int. Cl.
*C08K 3/22* (2006.01)
*C09C 3/12* (2006.01)
*C09C 1/30* (2006.01)

(52) U.S. Cl.
CPC ............. *C09C 1/3081* (2013.01); *C09C 3/12* (2013.01); *C08K 3/22* (2013.01)
USPC .......................................... 524/588; 524/589

(58) Field of Classification Search
USPC ................................. 524/588, 589
See application file for complete search history.

(56) References Cited

U.S. PATENT DOCUMENTS

| | | | |
|---|---|---|---|
| 5,364,955 A | 11/1994 | Zwiener et al. | |
| 5,998,504 A | 12/1999 | Groth et al. | |
| 6,720,072 B1 | 4/2004 | Hinterwaldner et al. | |
| 6,750,270 B1 | 6/2004 | Klostermann et al. | |
| 7,169,832 B2 | 1/2007 | Poppe et al. | |
| 8,088,880 B2 * | 1/2012 | Nennemann et al. | 528/45 |
| 2008/0017071 A1 | 1/2008 | Moebus et al. | |
| 2008/0028983 A1 | 2/2008 | Briehn et al. | |
| 2008/0119601 A1 | 5/2008 | Nennemann et al. | |
| 2008/0226901 A1 * | 9/2008 | Stanjek et al. | 428/334 |
| 2010/0130642 A1 | 5/2010 | Stanjek et al. | |

FOREIGN PATENT DOCUMENTS

| | | |
|---|---|---|
| DE | 19715426 | 10/1998 |
| DE | 19846660 | 4/2000 |
| DE | 19933098 | 1/2001 |
| DE | 10247359 | 4/2004 |
| DE | 102005034348 | 1/2007 |
| DE | 102006054289 | 5/2008 |
| EP | 0872500 | 10/1998 |
| JP | 2002363438 A * | 12/2002 |
| WO | WO-03/044099 | 5/2003 |
| WO | WO-2006/008120 | 1/2006 |
| WO | WO-2006/018144 | 2/2006 |
| WO | WO-2006/084661 | 8/2006 |
| WO | WO 2007009569 A2 * | 1/2007 |

OTHER PUBLICATIONS

Machine translated English equivalent of JP 2002-363438 (Dec. 2002, 6 pages).*
Brinkmann, Andreas, et al., *Neuartige Stabilisierung von Sol-Gel-Nanopartikein in hochkratzfesten Dual-Cure Systemen* (2007), pp. 40-43, Farbe Und Lack.
Förster, Stephan, et al., *Amphiphilic Block Copolymers in Structure-Controlled Nanomaterial Hybrids* (1998), No. 3, vol. 10, pp. 195-217, Advanced Materials.
Laas, Josef, et al., *The Synthesis of Aliphatic Polyisocyanates Containing Biuret, Isocyanurate or Uretdione Backbones for Use in Coatings* (1994), vol. 336, pp. 185-200, J. Prakt. Chem.
Bock, *Polyurethane fur Lacke und Beschichtungen, Reaktionen von Isocyanaten* (1999), pp. 21-27, Vincentz Verlag, Hanover.

* cited by examiner

*Primary Examiner* — Ling Choi
*Assistant Examiner* — Brieann R Fink
(74) *Attorney, Agent, or Firm* — Novak Druce Connolly Bove + Quigg LLP

(57) ABSTRACT

The present invention relates to unblocked nano-particle-modified polyisocyanates having increased stability in the NCO content.

16 Claims, No Drawings

STABLE POLYISOCYANATES COMPRISING NANOPARTICLES

CROSS-REFERENCE TO RELATED APPLICATIONS

This application is a national stage application (under 35 U.S.C. §371) of PCT/EP2009/003192, filed May 5, 2009, which claims benefit of European application EP08009064.0 filed May 16, 2008.

BACKGROUND OF THE INVENTION

The present invention relates to non-blocked, nanoparticle-modified polyisocyanates which are distinguished by increased stability in their NCO content.

A series of patents describe surface-functionalized particles having groups that are potentially reactive towards the film-forming resins, and their use in coatings (EP-A 0 872 500, WO 2006/018144, DE-A 10 2005 034348, DE-A 199 33 098, DE 102 47 359). The particles in question include nanoparticles which carry blocked isocyanate groups, and dispersions thereof, which are used in a blend with binders. These systems are stable even on prolonged storage, in terms of their NCO content, which suffers no degradation.

EP-A 0 872 500 and WO 2006/018144 disclose, for example, colloidal metal oxides whose nanoparticle surfaces have been modified via covalent attachment of alkoxysilanes. The alkoxysilanes used for the modification are addition products of aminoalkoxysilanes and blocked, monomeric isocyanates. Metal oxides modified in this way are then mixed with the binders and curing agents and used as an isocyanate component for the production of coating materials. Essential to the invention here is the presence of water and alcohol in the preparation process for the hydrolysis of the alkoxy groups, with subsequent condensation on the particle surfaces, producing a covalent attachment. Likewise essential to the invention is the blocking of free NCO groups in order to prevent reaction with water and alcoholic solvent. The systems in question here, therefore, are modified nanoparticles and not nanoparticle-containing polyisocyanates. On reaction, accordingly, the nanoparticles are incorporated covalently into the film-forming matrix and hence dominate the film-forming matrix, which from experience can lead to detractions in terms of the flexibility. It is disadvantageous, moreover, that owing to this process, which makes the use of water and alcoholic solvent essential, it is not possible to use non-blocked polyisocyanates.

Farbe and Lack 7 (2007), p. 40 ff reports the coagulation of nanoscale silica particles as a result of addition of polyisocyanates to a two-component coating formulation. The silica particles are located in the polyol phase; the polyisocyanate is added as second component. As a result of addition of carboxylic acids to the mixture of polyol and silica particles, coagulation after blending with polyisocyanate is suppressed. There is no description of corresponding formulations, in the form of storage-stable products in polyisocyanate, in which the isocyanate content is not reduced over time. Carboxylic acids can react by reaction with polyisocyanate and lead to unwanted secondary reactions, and hence adversely affect the film-forming properties.

Applications DE 10 2006 054289 and EP 07021690.2 disclose colloidally stable, transparent and translucent, respectively, nanoparticle-containing polyisocyanates which are obtained by modification of polyisocyanates with aminoalkoxysilanes and aminoalkoxysilanes respectively and polydimethylsiloxanes and addition of nanoparticles. On storage, however, nanoparticle-containing polyisocyanates of this kind are unstable in terms of their NCO content, as a function of the solvent used.

Starting out from the prior art, then, the problem addressed was that of providing non-blocked, nanoparticle-containing polyisocyanates, especially for 2K (2-component) polyurethane applications.

It has now surprisingly been found that such polyisocyanates can be obtained by preceding contact between polyisocyanate to be modified and nanoparticles by a special surface modification of the particles.

DESCRIPTION OF THE INVENTION

The present invention accordingly provides a process for preparing nanoparticle-modified polyisocyanates having free NCO groups, wherein
A) nanoparticles having an average particle size as determined by means of dynamic light scattering of smaller than 200 nm are reacted with
B) alkoxysilyl- and NCO-containing adducts of the formula (I)

$$\text{OCN—R}^1\text{—NHCO-QR}^2\text{Z—SiX}_a\text{Y}_{3-a} \qquad (1)$$

where
$R^1$ is a $C_1$-$C_{14}$ linear or cyclic aliphatic group or a $C_6$-$C_{14}$ araliphatic or aromatic group,
$R^2$ applies when Q=N and is hydrogen, a $C_1$-$C_{12}$ alkyl group or a $C_6$-$C_{20}$ aryl or aralkyl group or an aspartic ester radical,
Q is oxygen, sulphur, nitrogen,
X is a hydrolysable group,
Y is identical or different alkyl groups,
Z is a $C_1$-$C_{12}$ alkylene group and
a is an integer from 1 to 3,
and the products are subsequently blended with
C) polyisocyanates having free NCO groups.

The particles used in A) are used preferably as a dispersion in the process of the invention. These dispersions are preferably in an organic solvent as dispersion medium.

Solvents suitable by way of example are methanol, ethanol, isopropanol, acetone, 2-butanone, methyl isobutyl ketone, and also the solvents that are common in polyurethane chemistry, such as butyl acetate, ethyl acetate, 1-methoxy-2-propyl acetate, toluene, xylene, solvent naphtha, 1,4-dioxane, diacetone alcohol, N-methylpyrrolidone, dimethylacetamide, dimethylformamide, dimethyl sulphoxide or any desired mixtures of such solvents.

Preferred organic solvents are those of the aforementioned kind that do not have groups that are reactive towards NCO groups. Such solvents are, for example, butyl acetate, ethyl acetate, 1-methoxy-2-propyl acetate, toluene, 2-butanone, xylene, solvent naphtha, 1,4-dioxane, diacetone alcohol, N-methylpyrrolidone, dimethylacetamide, dimethylformamide, dimethyl sulphoxide or any desired mixtures of such solvents.

Particularly preferred organic solvents are butyl acetate, 1-methoxy-2-propyl acetate, ethyl acetate, toluene, xylene, solvent naphtha, methyl ethyl ketone, and their mixtures.

The particles used in A) are typically inorganic oxides, mixed oxides, hydroxides, sulphates, carbonates, carbides, borides and nitrides of elements from main groups II to IV and/or elements of transition groups I to VIII of the Periodic Table, including the lanthanides. Silicon oxide, aluminium oxide, cerium oxide, zirconium oxide, niobium oxide and titanium oxide are preferred. Silicon oxide nanoparticles are especially preferred.

The particles used in A) preferably have average particle sizes, determined as the Z-average by means of dynamic light scattering in dispersion, of 5 to 100 nm, more preferably 5 to 50 nm.

Preferably at least 75%, more preferably at least 90% and very preferably at least 95% of all of the particles used in A) have the sizes defined above.

The particles used in A) are preferably already surface-modified in one or more other ways, as for example by silanization in accordance with DE-A 19846660 or WO 03/44099.

Furthermore, or alternatively, the surfaces of the particles used in A) may have been adsorptively/associatively modified by surfactants having head groups of corresponding interactions with respect to the particle surfaces, or block copolymers, as described for example in WO 2006/008120 and in Foerster. S. & Antonietti, M., Advanced Materials, 10, No. 3 (1998) 195.

Preferred surface modification is silanization with alkoxysilanes and/or chlorosilanes. With especial preference the silanes in question are silanes which apart from the alkoxy groups carry inert alkyl or aralkyl radicals, but no other functional groups.

Examples of commercial particle dispersions of the kind suitable for A) are Organosilicasol™ (Nissan Chemical America Corporation, USA), Nanobyk® 3650 (BYK Chemie, Wesel, Germany), Hanse XP21/1264 or Hanse XP21/1184 (Hanse Chemie, Hamburg, Germany), HIGHLINK® NanO G (Clariant GmbH, Sulzbach, Germany). Suitable organosols have a solids content of 10% to 60% by weight, preferably 15% to 50% by weight.

Adducts B of the formula (I) are obtainable for example, by reaction of alkoxysilanes $HQR^2Z—SiX_aY_3$, (III) with non-blocked monomeric diisocyanates $OCN—R^1—NCO$ (II).

In formula (III) and hence also in formula (I), the group X is preferably an alkoxy or hydroxyl group, more preferably methoxy, ethoxy, propoxy or butoxy.

In formula (III) and hence also in formula (I), Y is preferably a linear or branched $C_1$-$C_4$ alkyl group, preferably methyl or ethyl.

In formula (III) and hence also in formula (I), Z is preferably a linear or branched $C_1$-$C_4$ alkylene group.

In formula (III) and hence also in formula (I), a is preferably 1 or 2.

In formula (III), the group QH is preferably a group which is reactive towards isocyanates with formation of urethane, urea or thiourea. These are, preferably, OH, SH or NH groups, more preferably NH groups.

When Q is an oxygen group or a sulphur group, $R^2$ is absent. In the case of nitrogen as Q, the amino groups corresponding to (III) produce the formula $—NHR^2$.

$R^2$ is hydrogen, a $C_1$-$C_{12}$ alkyl group or a $C_6$-$C_{20}$ aryl or aralkyl group or an aspartic ester radical. Preferably $R^2$ is a $C_1$-$C_{12}$ alkyl group, in that case more preferably a $C_1$-$C_4$ alkyl group, or an aspartic ester. With very particular preference $R^2$ is an aspartic ester radical of the formula $R^3OOC—CH_2—CH(COOR^4)—$.

$R^3$ and $R^4$ are preferably identical or different alkyl radicals which optionally may also be branched having 1 to 22 carbon atoms, preferably 1 to 4 carbon atoms. With particular preference $R^3$ and $R^4$ are each methyl or ethyl radicals.

Alkoxysilane-functional aspartic esters of this kind are obtainable, as described in U.S. Pat. No. 5,364,955, in conventional manner, through addition of amino-functional alkoxysilanes with maleic or fumaric esters.

Amino-functional alkoxysilanes of the kind which can be used as compounds of the formula III or for preparing the alkoxysilyl-functional aspartic esters are, for example, 2-aminoethyldimethylmethoxysilane, 3-aminopropyltrimethoxysilane, 3-aminopropyltriethoxysilane, 3-aminopropylmethyldimethoxysilane, aminopropylmethyldiethoxysilane.

Additionally possible as aminoalkoxysilanes having secondary amino groups, of the formula (III) in B) are also N-methyl-3-aminopropyltrimethoxysilane, N-methyl-3-aminopropyltriethoxysilane, N-phenyl-3-aminopropyltrimethoxysilane, bis(gamma-trimethoxysilylpropyl)amine, N-butyl-3-aminopropyltrimethoxysilane, N-butyl-3-aminopropyltriethoxysilane, N-ethyl-3-aminoisobutyltrimethoxysilane, N-ethyl-3-aminoisobutyltriethoxysilane, or N-ethyl-3-aminoisobutylmethyldimethoxysilane, N-ethyl-3-aminoisobutylmethyldiethoxysilane and also the analogous $C_2$-$C_4$ alkoxysilanes.

Suitable maleic or fumaric esters for preparing the aspartic esters are dimethyl maleate, diethyl maleate, di-n-butyl maleate and also the corresponding fumaric esters. Dimethyl maleate and diethyl maleate are particularly preferred.

A preferred aminosilane for preparing the aspartic esters is 3-aminopropyltrimethoxysilane or 3-aminopropyltriethoxysilane.

The reaction of the maleic and/or fumaric esters with the aminoalkylalkoxysilanes takes place within a temperature range of 0 to 100° C., the proportions being generally chosen such that the starting compounds are used in a 1:1 molar ratio. The reaction may be carried out in bulk or else in the presence of solvents such as, for example, dioxane. The accompanying use of solvents, however, is less preferred. It is of course also possible for mixtures of different 3-aminoalkylalkoxysilanes to be reacted with mixtures of fumaric and/or maleic esters.

Preferred alkoxysilanes (III) for modifying the diisocyanates are secondary aminosilanes with $R^2$=$C_1$-$C_{12}$ of the type described above, more preferably aspartic esters with $R^2$=$R^3OOC—CH_2—CH(COOR^4)—$ of the type described above, and also dialkoxy- and/or monoalkoxysilanes. The abovementioned alkoxysilanes can be used individually or else in mixtures for the modification.

Suitable diisocyanates of the formula (II) are any desired diisocyanates of the molecular weight range 140 to 400 g/mol which are obtainable by phosgenation or by phosgene-free processes, as for example by thermal urethane cleavage, and having aliphatically, cycloaliphatically, araliphatically and/or aromatically attached isocyanate groups, such as 1,4-diisocyanatobutane, 1,6-diisocyanatohexane (HDI), 2-methyl-1,5-diisocyanatopentane, 1,5-diisocyanato-2,2-dimethylpentane, 2,2,4- and/or 2,4,4-trimethyl-1,6-diisocyanatohexane, 1,10-diisocyanatodecane, 1,3- and 1,4-diisocyanatocyclohexane, 1,3- and 1,4-bis(isocyanatomethyl)cyclohexane, 1-isocyanato-3,3,5-trimethyl-5-isocyanatomethylcyclohexane (isophorone diiso-cyanate, IPDI), 4,4'-diisocyanatodicyclohexylmethane, 1-isocyanato-1-methyl-4(3)-isocyanatomethylcyclohexane, bis(isocyanatomethyl)norbornane, 1,3- and 1,4-bis(1-isocyanato-1-methylethyl)benzene (TMXDI), m-xylylene diisocyanate (XDI), 2,4- and 2,6-diisocyanatotoluene (TDI), 2,4'- and 4,4'-diisocyanatodiphenylmethane (MDI), 1,5-diisocyanatonaphthalene or any desired mixtures of such diisocyanates.

In B) it is preferred to use adducts of the aforementioned kind, based on IPDI, MDI, TDI, HDI or mixtures thereof. Particular preference is given to adducts based on IPDI and HDI, very preferably based on HDI.

Accordingly $R^1$ in formula (II) and formula (I) is therefore a $C_1$-$C_{14}$ linear, branched or cyclic aliphatic group or a $C_6$-$C_{14}$ araliphatic or aromatic group. Preferably $R^1$ is a $C_4$-$C_{14}$, more preferably a linear or cyclic aliphatic or araliphatic or aromatic $C_6$-$C_{13}$ group.

$R^1$ accordingly preferably conforms to one of the following structural formulae:

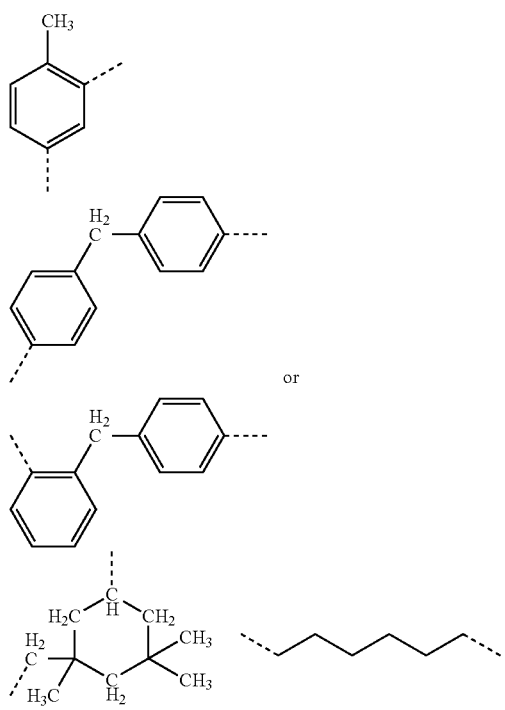

With particular preference $R^1$ therefore conforms to one of the following formulae:

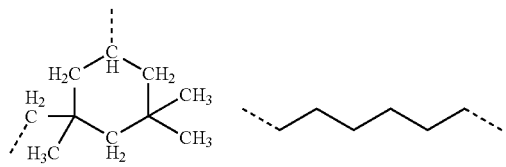

In principle, for the reaction of (II) and (III), it is possible, in place of the diisocyanates of the formula (II), to use oligomeric isocyanates as described for C) as well, although this is not preferred.

In the reaction between isocyanate of the formula (II) and alkoxysilane of the formula (III) the ratio of free NCO groups from (II) to the NCO reactive groups (Q) from (III) is preferably 1:0.01 to 1:0.75, more preferably 1:0.05 to 1:0.5, very preferably 1:0.1 to 1:0.4.

In principle, of course, it is also possible to modify higher fractions of NCO groups with the aforementioned alkoxysilanes, but care should be taken that no gelling occurs and/or that in the event of dilution the procedure is carried out in isocyanate-inert solvents.

The reaction of aminosilane(III) and diisocyanate(II) takes place at 0 to 100° C., preferably at 0 to 50° C., more preferably at 15° to 40° C. Where appropriate, an exothermic reaction can be controlled by cooling.

The modification of the nanoparticles used in A) with the modifier B) takes place in a weight ratio of modifier B) to the sum of the amounts of modifier B) and solid nanoparticle material from A) of typically 1% to 50%, preferably 10% to 50%, more preferably 20% to 40%.

Where the particles in A) are used as a dispersion, the modified organosol obtained thus after the reaction of A) with B) has solids of 1% to 70%, preferably 5% to 50%, more preferably 10% to 40%, by weight.

The reaction of A) with B) takes place at temperatures of typically 0° C. to 100° C., preferably 20 to 90° C., more preferably 40 to 80° C. The reaction time is typically 1 to 24 hours, preferably 2 to 12 hours, more preferably 4 to 10 hours.

In C), it is possible in principle to use all of the NCO-functional compounds that are known per se to the person skilled in the art and have more than one NCO group per molecule. These compounds preferably have NCO functionalities of 2.3 to 4.5, NCO group contents of 11.0% to 24.0% by weight, and monomeric diisocyanate contents of preferably less than 1% by weight, more preferably less than 0.5% by weight.

Polyisocyanates of this kind are obtainable by modifying simple aliphatic, cycloaliphatic, araliphatic and/or aromatic diisocyanates and may contain uretdione, isocyanurate, allophanate, biuret, iminooxadiazinedione and/or oxadiazinetrione structures. Additionally, it is possible for such polyisocyanates to be used as prepolymers containing NCO groups. Polyisocyanates of this kind are described in, for example, Laas et al. (1994), J. prakt. Chem. 336, 185-200 or in Bock (1999), Polyurethane far Lacke and Beschichtungen, Vincentz Verlag, Hanover, pp. 21-27.

Suitable diisocyanates for preparing such polyisocyanates are any desired diisocyanates of the molecular weight range 140 to 400 g/mol which are obtainable by phosgenation or by phosgene-free processes, as for example by thermal urethane cleavage, and having aliphatically, cycloaliphatically, araliphatically and/or aromatically attached isocyanate groups, such as 1,4-diisocyanatobutane, 1,6-diisocyanatohexane (HDI), 2-methyl-1,5-diisocyanatopentane, 1,5-diisocyanato-2,2-dimethylpentane, 2,2,4- and/or 2,4,4-trimethyl-1,6-diisocyanatohexane, 1,10-diisocyanatodecane, 1,3- and 1,4-diisocyanatocyclohexane, 1,3- and 1,4-bis(isocyanatomethyl)cyclohexane, 1-isocyanato-3,3,5-trimethyl-5-isocyanato-methylcyclohexane (isophorone diisocyanate, IPDI), 4,4'-diisocyanatodicyclo-hexylmethane, 1-isocyanato-1-methyl-4(3)-isocyanatomethylcyclohexane, bis(isocyanatomethyl)norbornane, 1,3- and 1,4-bis(1-isocyanato-1-methylethyl) benzene (TMXDI), 2,4- and 2,6-diisocyanatotoluene (TDI), 2,4'- and 4,4'-diisocyanatodiphenylmethane (MDI), 1,5-diisocyanatonaphthalene or any desired mixtures of such diisocyanates.

Likewise possible is the use of polyisocyanates which have an inorganic modification via NCO-reactive alkoxy silanes or siloxanes. They are described in, for example, applications DE 10 2006 054289 and EP 07021690.2.

In this context, polyisocyanates described under C) are additionally reacted with alkoxysilanes of the formula (III), as already observed for monomeric isocyanates of the formula (II). The preferences are corresponding. It is, however, preferred to use unmodified polyisocyanates.

In C), it is preferred to use polyisocyanates of the aforementioned kind that are based on IPDI, MDI, TDI, HDI or mixtures thereof. Particular preference is given to using polyisocyanates based on IPDI and HDI.

The proportions of modified particles and polyisocyanate C) are typically chosen so as to result in a particle content of 1% to 70%, preferably 5% to 60%, more preferably 10% to 50%, by weight, based in each case on the solids.

Polyisocyanates modified in this way with protected organosols have the feature that the NCO content after 90 days is more than 80% of the NCO value measured at the outset in accordance with DIN EN ISO 11909, but preferably greater than 90%, with very particular preference greater than 95%.

The invention further provides the polyisocyanates obtainable by the process of the invention, and also their use in coating materials, adhesives, and sealants.

Additionally provided by the invention are substrates coated or adhesively bonded using the polyisocyanates of the invention.

EXAMPLES

Unless indicated to the contrary, all percentages are to be understood as percent by weight.

Desmodur® N 3300: hexamethylene diisocyanate trimer; NCO content 21.8+/−0.3% by weight, viscosity at 23° C. about 3000 mPas, Bayer MaterialScience AG, Leverkusen, Del.

Organosilicasol™ MEK-ST: colloidal silica dispersed in methyl ethyl ketone, particle size 10-15 nm (manufacturer figure), 30 wt % $SiO_2$, <0.5 wt % $H_2O$, <5 mPas viscosity, Nissan Chemical America Corporation, USA.

Determination of the Particle Size

The particle sizes were determined by means of dynamic light scattering using an HPPS particle size analyser (Malvern, Worcestershire, UK). Evaluation was made using the Dispersion Technology software 4.10. In order to prevent multiple scattering a highly dilute dispersion of the nanoparticles was prepared. One drop of nanoparticle dispersion was placed in a cell containing approximately 2 ml of the same solvent as the dispersion, shaken and measured in the HPPS analyzer at 20 to 25° C. The relevant parameters of the dispersion medium—temperature, viscosity and refractive index—were taken into account for the evaluation. In the case of organic solvents a glass cell was used. The result obtained was an intensity/or volume/particle diameter plot and also the Z-average for the particle diameter. Attention was paid to the polydispersity index being <0.5.

NCO content was determined in accordance with DIN EN ISO 11909.

Example 1a

Diethyl N-(3-trimethoxysilylpropyl)aspartate was prepared, in accordance with the teaching from U.S. Pat. No. 5,364,955, Example 5, by reaction of equimolar amounts of 3-aminopropyltrimethoxysilane with diethyl maleate.

Example 1b

Preparation of the Modifier

A standard stirring apparatus was charged with 546.1 g (1 eq) of hexamethylene diisocyanate at room temperature and nitrogen was passed over the initial charge at 2 L/h. Then, over the course of 2 h at room temperature, 453.9 g (0.2 eq) of the alkoxysilane from Example 1a were added dropwise. The temperature was held at 40° C. until the theoretical NCO content was attained. This gave a clear, pale yellowish adduct having an NCO content of 21.6%.

Example 1c

Preparation of the Modified Organosol

A standard stirring apparatus was charged with 144.4 g of the adduct from Example 1b at room temperature and nitrogen was passed over the initial charge at 2 L/h, and the initial charge was heated at 72° C. under reflux. 1155.6 g of Organosilicasol™ MEK-ST were added dropwise over the course of 30 minutes, and the temperature of 72° C. was held for 8 hours and then reduced.

This gave a translucent dispersion with 0.85% NCO content and solids of 37.8%.

Example 1d

Preparation of a Modified Polyisocyanate in Accordance with DE 10 2006 054289

A standard stirring apparatus was charged with 567.7 g (1 eq) of Desmodur® N3300 in 100 g of methyl ethyl ketone at room temperature, and nitrogen was passed over this initial charge at 2 L/h. Then, over the course of 3 h at room temperature 232.3 g (0.2 eq) of the alkoxysilane from Example 1 in 100 g of butyl acetate were added dropwise. This gave a colourless liquid polyisocyanate having the following characteristics: solids content 79% by weight, NCO content 9.6%.

Example 2

Comparative Example According to DE 10 2006 054289

35.6 g of the silane-functional polyisocyanate from Example 1d were blended with 93.75 g of Organosilicasol™ MEK-ST and 20.65 g of butyl acetate. This gave 150 g of a nanoparticle-modified polyisocyanate with a 2.25% NCO content, solids of 37.5% and an $SiO_2$ content of approximately 50% solids/solids.

Example 3a

Inventive Example 234.4 g of Desmodur® N3300 were mixed with 1265.6 g of the organosol from Example 1c and the mixture was adjusted to a solids content of 47.8% on a rotary evaporator at 60° C. and 120 mbar. This gave a transparent product having a viscosity of about 20 mPas (23° C.), about 59% $SiO_2$ in the solids and an NCO content of 4.05%.

Example 3b

Inventive Example with Aminosilane-Modified Polyisocyanate Corresponding to DE 10 2006 054289

93.2 g of the polyisocyanate from Example 1d were mixed with 281.8 g of the organosol from Example 1c and the mixture adjusted to a solids content of 54.8% on a rotary evaporator at 60° C. and 120 mbar. This gave a transparent product having a viscosity of about 50 mPas (23° C.), about 50% $SiO_2$ in the solids and an NCO content of 3.49%.

TABLE 1

Assessment of NCO stability[1]

| Time | Example 2 comparative | Example 3a inventive NCO content/% | Example 3b inventive |
|---|---|---|---|
| <2 h | 2.25 | 4.05 | 3.49 |
| 14 days | 0.99 | 4.05 | 3.36 |

TABLE 1-continued

Assessment of NCO stability[1]

| Time | Example 2 comparative | Example 3a inventive NCO content/% | Example 3b inventive |
|---|---|---|---|
| 21 days | 0.86 | 4 | 3.29 |
| 28 days | 0.88 | 3.97 | 3.21 |
| 56 days | 0.73 | 3.5 | 3.15 |
| 91 days | 0.68 | 3.88 | 3.04 |

[1]NCO content determination in accordance with DIN EN ISO 11909

As is evident from Table 1, the NCO content of a polyisocyanate containing Organosilicasol™ MEK-ST drops from 2.25% at the beginning to 0.68% after 91 days. The NCO content reduces, accordingly to about 30%. In the case of the inventive examples 3a and 3b, the NCO content after 91 days is still about 96% or 87%, respectively, of the initial value.

Application of the Nanoparticle-Modified Polyisocyanates of the Invention:

The nanoparticle-modified polyisocyanates are suitable, in correspondence with the nanoparticle-modified polyisocyanates described in DE 10 2006 054289, for the improvement of hardness and/or scratch resistance, in comparison to the unmodified polyisocyanates.

The invention claimed is:

1. A process for preparing a nanoparticle-modified polyisocyanate having free NCO groups, which comprises
A) reacting
  1) nanoparticles having an average particle size, as determined by dynamic light scattering, of smaller than 200 nm with
  2) an alkoxysilyl- and an NCO-containing adduct of the formula (I)

$OCN-R^1-NHCO-QR^2Z-SiX_aY_{3-a}$ (I)

wherein,
    $R^1$ represents a substituent selected from the group consisting of $C_1$-$C_{14}$ linear groups, $C_3$-$C_{14}$ cyclic aliphatic groups, $C_6$-$C_{14}$ araliphatic groups, and $C_6$-$C_{14}$ aromatic groups;
    Q represents a substituent selected from the group consisting of oxygen, sulphur, and nitrogen;
    $R^2$ when Q is nitrogen, represents a substituent selected from the group consisting of hydrogen, $C_1$-$C_{12}$ alkyl groups, $C_6$-$C_{20}$ aryl groups, $C_6$-$C_{20}$ aralkyl groups, and aspartic ester radicals;
    X represents a hydrolysable group;
    Y independently of one another, represent an alkyl group;
    Z represents a $C_1$-$C_{12}$ alkylene group; and
    a represents an integer from 1 to 3;
  to form products of the reaction; and
B) blending the products of the reaction with a polyisocyanate having free NCO groups,
wherein the nanoparticle-modified polyisocyanate has an NCO content after 90 days of more than 80% of the initial NCO content measured in accordance with DIN EN ISO 11909.

2. The process according to claim 1, further comprising mixing the nanoparticles with an organic solvent to form a dispersion.

3. The process according to claim 2, wherein the organic solvent is selected from the group consisting of butyl acetate, 1-methoxy-2-propyl acetate, ethyl acetate, toluene, xylene, solvent naphtha, methyl ethyl ketone, and mixtures thereof.

4. The process according to claim 1, wherein the nanoparticles are selected from the group consisting of silicon oxide, aluminium oxide, cerium oxide, zirconium oxide, niobium oxide, titanium oxide, and mixtures thereof.

5. The process according to claim 1, wherein the nanoparticles have an average particle size, as determined by the Z-average by dynamic light scattering in dispersion, of 5 to 50 nm.

6. The process according to claim 1, wherein the nanoparticles are surface-modified.

7. The process according to claim 1, wherein in formula (I)
  $R^1$ represents a substituent selected from the group consisting of a linear aliphatic group, a cycloaliphatic group, an araliphatic $C_6$-$C_{13}$ group, and an aromatic $C_6$-$C_{13}$ group;
  $R^2$ applies when Q is nitrogen and represents a $C_1$-$C_4$ alkyl group or an aspartic ester radical of the formula (II)

$R^3OOC-CH_2-CH(COOR^4)-$ (II)

wherein,
    $R^3$ and $R^4$ represent, independently of one another, alkyl radicals having 1 to 22 carbon atoms.
  Q represents a substituent selected from the group consisting of oxygen, sulphur, and nitrogen;
  X represents an alkoxy or hydroxyl group;
  Y represents a linear or branched $C_1$-$C_4$ alkyl group;
  Z represents a linear or branched $C_1$-$C_4$ alkylene group; and
  a represents an integer from 1-2.

8. The process according to claim 7, wherein at least one of the alkyl radicals represented by $R^3$ and $R^4$ in formula (II) is branched.

9. The process according to claim 7, wherein at least one of the alkyl radicals represented by $R^3$ and $R^4$ in formula (II) has 1 to 4 carbon atoms.

10. The process according to claim 7, wherein R3 and R4 represent, independently of one another, a methyl or an ethyl radical.

11. The process-according to claim 1, wherein the polyisocyanate is based on IPDI, MDI, TDI, HDI or mixtures thereof.

12. A nanoparticle-modified polyisocyanate having free NCO groups, obtained by the process according to claim 1.

13. A coating material, adhesive, or sealant comprising the nanoparticle-modified polyisocyanate according to claim 12.

14. A coated or adhesively bonded substrate comprising the nanoparticle-modified isocyanates having free NCO groups according to claim 12.

15. The process according to claim 1, wherein the polyisocyanate in B) has an NCO functionality of 2.3 to 4.5.

16. The process according to claim 2, further comprising step C), evaporating the solvent.

* * * * *